Figure 1:
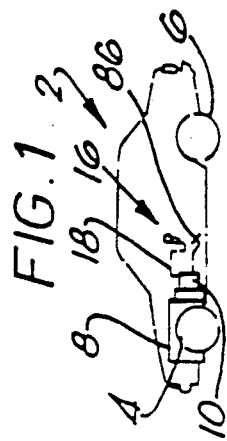

United States Patent [19]
Jarvis

[11] Patent Number: 5,072,815
[45] Date of Patent: Dec. 17, 1991

[54] POWER LINE TO DRIVE A VEHICLE

[75] Inventor: Roger P. Jarvis, Leamington, United Kingdom

[73] Assignee: Automotive Products plc, England

[21] Appl. No.: 601,681

[22] PCT Filed: Jan. 31, 1989

[86] PCT No.: PCT/GB89/00089
§ 371 Date: Oct. 25, 1990
§ 102(e) Date: Oct. 25, 1990

[87] PCT Pub. No.: WO89/10282
PCT Pub. Date: Nov. 2, 1989

[30] Foreign Application Priority Data

Apr. 30, 1988 [GB] United Kingdom ............. 8810365

[51] Int. Cl.⁵ ............................................. B60K 41/08
[52] U.S. Cl. ................................ 192/0.08; 192/0.084; 192/0.092
[58] Field of Search ............... 192/0.08, 0.084, 0.092

[56] References Cited

U.S. PATENT DOCUMENTS

| | | | |
|---|---|---|---|
| 4,192,279 | 3/1980 | Maisch et al. | 192/0.084 |
| 4,194,608 | 3/1980 | Usui et al. | 192/0.084 |
| 4,506,778 | 3/1985 | Schmid | 192/0.08 |
| 4,533,030 | 8/1985 | Gabriel | 192/0.052 |
| 4,785,917 | 11/1988 | Tateno et al. | 192/0.08 |

FOREIGN PATENT DOCUMENTS

| | | |
|---|---|---|
| 0189050 | 7/1986 | European Pat. Off. . |
| 0079114 | 9/1986 | European Pat. Off. . |
| 2609213 | 9/1977 | Fed. Rep. of Germany . |
| 3334710 | 4/1985 | Fed. Rep. of Germany . |
| 2067258 | 7/1981 | United Kingdom . |
| 2088009 | 6/1982 | United Kingdom . |
| 2117139 | 10/1983 | United Kingdom . |

Primary Examiner—Leslie A. Braun
Assistant Examiner—Nicholas Whitelaw
Attorney, Agent, or Firm—Davis, Bujold & Streck

[57] ABSTRACT

A motor vehicle power line comprises a combustion engine (8), a gearbox (10) and an electronically controlled clutch (20). The engine throttle (84) is actuated by an electric motor (92) controlled by the electronic control (48) usually in response to throttle demand signals. A manual move of the gear shift level (16) causes the clutch (20) automatically to disengage. When a new gear is engaged the clutch (20) is automatically re-engaged. When the gear change is an up-change the clutch (20) is automatically disengaged to lower (102) its torque transmitting capacity (C) from a maximum (C1) to zero. As the gear change progresses the new gear starts to be engaged causing the speed (B) of the gearbox input shaft (14) and clutch driven plate (32) to drop (110) to (Sn). While this is happening control (48) takes full control of the throttle and closes it. The disengaged clutch and closed throttle causes the engine speed (A) to decelerate (114). When the new gear is fully engaged at time (t4), the control (48) causes the clutch to re-engage at a first relatively quck rate (118) from zero up to a pre-determined target torque transmitting capacity (Ct) and then at a lower rate (124).

11 Claims, 2 Drawing Sheets

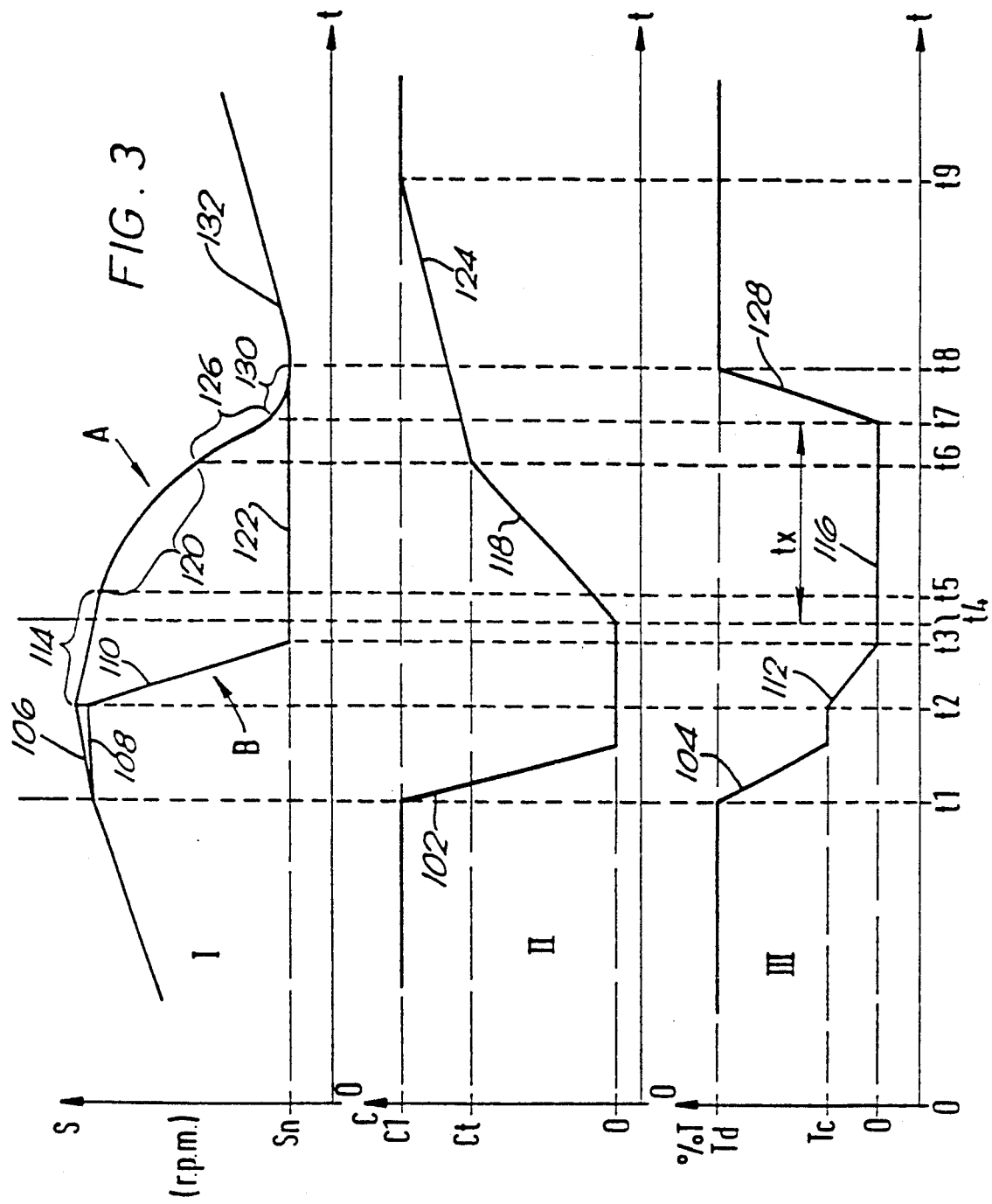

POWER LINE TO DRIVE A VEHICLE

This invention concerns a power line to drive a motor vehicle.

The power line concerned, to drive at least one ground running wheel of a motor vehicle, is of the type (hereinafter called "the type referred to) comprising an internal combustion engine giving a rotary motion output, fuel supply means to supply fuel to said engine, said fuel supply means comprising controllable throttle means openable and closeable to vary the amount that the throttle means is open to increase and decrease supply of fuel to the engine, a change-speed gearbox having a rotary output shaft for supplying rotary motion to said ground running wheel and a rotary input shaft for receiving output torque from the engine and a plurality of gear ratios between said shafts, each gear ratio being engageable and disengageable in response to operation of gear ratio selector means in response to manual action of a driver of the vehicle, a clutch interposed between said engine and said input shaft for transmitting engine output torque to the input shaft, clutch control means operable to vary the torque transmitting capacity of said clutch over a range from a pre-determined maximum capacity (clutch fully engaged) to substantially zero capacity (clutch fully disengaged), the clutch control means being responsive to occurrence of a first signal indicative of a wish by the driver to disengage the currently engaged said gear ratio and being responsive to occurrence of a second signal indicative that another said gear ratio has been engaged, said clutch control means responding to said first signal to cause the clutch automatically to disengage substantially fully and responding to said second signal to cause the clutch automatically to engage substantially fully, and throttle control means to open and close said throttle means in response to driver initiated throttle demand signals.

In this specification and appended claims "throttle means" is intended to mean any appropriate device for varying the supply of fuel to a combustion chamber of an internal combustion engine and includes:
  (i) a butterfly or pivotting flap valve in a venturi or induction passage of a carburettor for a petrol engine,
  (ii) a butterfuly or pivotting flap valve in a venturi or induction passage in conjunction with variable fuel injection means of a fuel injection system for a petrol engine, and
  (iii) a rack and metering valve system for supplying fuel to a diesel engine.

In a motor vehicle driven forwards by a power line of the type referred to, the effect of changing up a gear by disengaging a forward said gear ratio and engaging a higher forward gear ratio, whilst the clutch is fully disengaged, is that momentum of the vehicle now drives the gearbox input shaft at a slower rotational speed than when the lower ratio was engaged.

When changing up a gear it is desirable, after the new higher ratio has been engaged, that the engine speed and the speed of the gearbox input shaft should be substantially the same (i.e. matched) when the clutch re-engages so that the full engine torque currently being delivered is applied to the transmission comprising the gearbox. Should the engine speed be significantly faster than that of the input shaft, the transmission receives shock on application of full engine torque.

Engine speed can be slowed by reducing the amount that the throttle means is open to reduce fuel supply. But because the clutch is fully disengaged, the engine is not under load and thus the deceleration of the engine is low and accordingly there is the disadvantage that the time taken to slow the engine speed to one which matches that of the input shaft can be relatively long.

An object of the invention is to provide a power line of the type refered to in which the aforesaid disadvantage is avoided and or at least mitigated.

According to the invention there is provided a power line of the type refered to characterised in that the throttle control means is automatically operable on occurrence of said first signal to vary the amount which said throttle means is open and is automatically operable on the subsequent occurrence of the second signal to restore the throttle means substantially to an open amount corresponding to that being demanded by the driver's current throttle demand signal, upon the occurrence of said first signal the throttle control means is operated automatically to at least reduce the amount that the throttle means is open to a value lower than that currently demanded by the driver, and upon occurrence of said second signal signifying to said clutch control means engagement of a higher gear ratio than the previously engaged ratio the clutch is automatically engaged such that the torque transmitting capacity of the clutch is increased at a first rate from substantially clutch fully disengaged up to a target torque transmitting capacity which is less than said pre-determined maximum and in the course of said increase up to the target torque transmitting capacity the torque transmitting capacity of the clutch is increased at a first rate and after attaining said target torque transmitting capacity the torque transmitting capacity of the clutch is automatically increased at a lower second rate towards said pre-determined maximum, and wherein in the course of increasing the torque transmitting capacity at said first rate the engaging clutch causes the engine to so slow that engine deceleration is greater than any immediately before occurence of the second signal.

In a particular embodiment the clutch control means may be arranged to operate such that upon the occurrence of said second signal signifying to said clutch control means engagement of a higher gear ratio than the previously engaged ratio the clutch is automatically engaged such that the torque transmitting capacity of the clutch is increased at the first rate from substantially clutch fully disengaged up to the target torque transmitting capacity and then automatically at a lower second rate from said target torque transmitting capacity towards said pre-determined maximum.

The clutch may be a friction clutch For example, a friction clutch driven plate may be substantially fast in rotation with the input shaft, said driven plate being releasably clampable between a pressure plate and a counter—pressure plate rotated by the engine.

The progressive increase in the torque transmitting capacity of the clutch at the first rate acts as a brake on the engine reducing the engine speed towards the speed of the input shaft.

The target torque capacity may be substantially equal to the engine torque output the engine would nave been delivering at substantially the time that the clutch attains the target capacity and the throttle means were open to the amount being demanded by the driver's current throttle demand signal. Namely the target torque capacity may be the torque output the engine should be delivering at the conclusions of the gear change and the throttle means is under the control of the driver.

Upon occurrence of said first signal the throttle control mean may operate automatically to close the throttle to substantially its closed or minimum position. Subsequent to occurence of said greater deceleration of said engine the throttle control means may operate automatically to restore the throttle means substantially to the open amount corresponding to that being demanded by the driver's current throttle demand signal, the attainment of said amount occuring at substantially the same time that the speeds of the engine and input shafts become the same.

If desired, then subsequent to occurence of said greater deceleration of said engine the throttle control means may operate automatically to restore the throttle means substantially to the open amount corresponding to that being demanded by the driver's current throttle demand signal, the attainment of said amount occuring after expiry of a pre-determined period of time after the initial occurence of said second signal.

Figure 4:
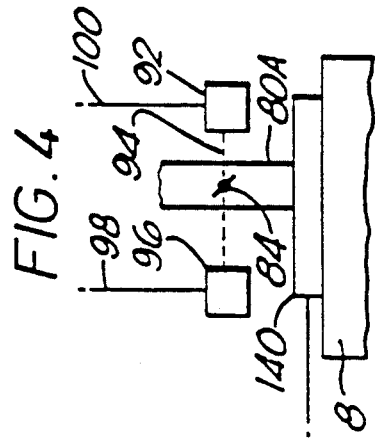
Figure 5:
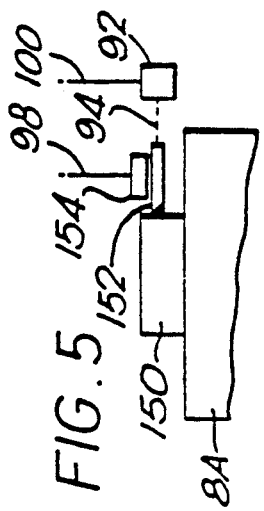
Figure 2:
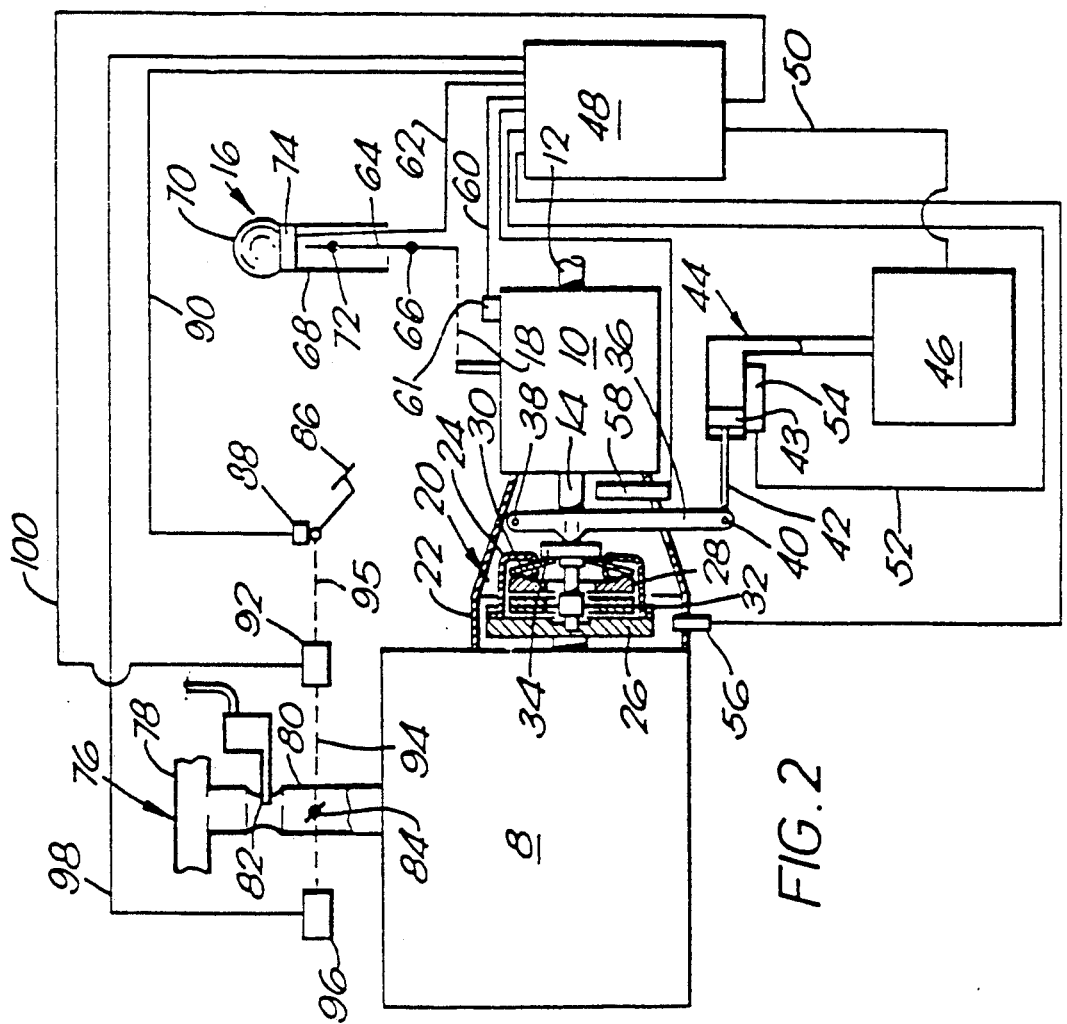

The invention will now be further described, by way of example, with reference to the accompanying drawings in which:

FIG. 1 diagrammatically represents a motor vehicle provided with a power line formed according to the invention;

FIG. 2 diagrammatically illustrates the power line used in FIG. 1;

FIG. 3 is a set of graphs illustrating operation of elements in the power line in FIG. 2 in the course of a gear change from a lower gear ratio to a higher ratio;

FIG. 4 diagrammatically represent a fuel injection system which may be substituted for the carburettor in FIG. 2, and;

FIG. 5 diagrammatically represents a diesel engine which may be used in the power line in FIG. 2 instead of the petrol engine, the throttle means being a rack controlled diesel fuel metering valve system.

FIG. 1 shows a motor vehicle 2 having front and rear road wheels 4 and 6, an internal combustion engine 8 and a change-speed gearbox 10 having a rotary output shaft 12 (FIG. 2) from which drive is taken in this example to drive the front wheels 4 but could be taken to drive the rear wheels instead of or in addition to the front wheels.

Referring now to FIGS. 1 and 2, the change-speed gearbox 10 has a rotary input shaft 14, and, between the input and output shafts, a plurality of forward gear ratios known per se each respectively engaged, or disengaged, in response to manual operation by the vehicle's driver of a gear ratio selector device 16, in this example in the form of a gear lever, from which signals, in this example in the form of movement, are transmitted via a connection or linkage 18 to gear ratio change means in the gearbox. On the other hand any form of manually actuable gear selector device may be used from which gear ratio disengage and engage signals can be transmitted to gear ratio change means in the gearbox 10.

Driving torque is input to the gearbox 10 through the input shaft 14 driven via a friction clutch 20, in a housing 22, by the engine 8. In this example the clutch 20 is a push—type diaphragm spring clutch know per se having a cover 24 secured to a fly-wheel or other counter-pressure plate 26 rotated by the engine. The clutch 20 includes a pressure plate 28 acted on by diaphragm spring 30 and a driven plate 32 with an internally splined central hub engaging splines on the input shaft 14. The clutch also has a release bearing 34 acted on by a release fork or lever 36 pivotably supported at 38 and pivoted at 40 to a thrust rod 42 of a piston 43 of a hydraulic actuator 44. The position of the piston 43 is controlled by the amount of hydraulic fluid in the actuator 44 and that amount of fluid is controlled by hydraulic control 46. Operation of the hydraulic control 46 is under control of an electronic control 48 comprising computer means connected by signal path 50 to the hydraulic control and by signal path 52 to a position sensor 54. Sensor 54 observes the position of the piston 43 in actuator 44. The position of piston 43 is correlated to the position of the pressure plate 28 relative to the counter-pressure plate 26, which relative position of the pressure plate 28 is a function of the torque transmitting capacity of the clutch 20, namely the maximum torque that the clutch can transmit at any instant to the input shaft 14 from the engine before occurence of clutch slip. The torque transmitting capacity is a function of the force exerted on the pressure plate 28 by the diaphragm spring 30 which in turn is a function of the position of the release bearing 34 and thus a function of the position of piston 43. In one extreme position of travel of the piston 43 the diaphragm spring 30 exerts maximum force on the pressure plate 28 and thus the torque transmitting capacity is a pre-determined maximum, hence the clutch 20 is fully engaged. In another extreme position of the piston 43 the diaphragm spring 30 exerts no pressure on the pressure plate 28 and thus the torque transmitting capacity is zero, hence the clutch is fully disengaged. Therefore depending on the position of piston 43 the torque transmitting capacity can be varied over the range from zero to said pre-determined maximum.

The electronic control 48 can signal the hydraulic control 46 to provide an amount of hydraulic fluid in the actuator 44 consistent with a desired torque transmitting capacity for the clutch 20, and the sensor 54 provides the electronic control with signals indicating the position of the piston 43 so that the electronic control knows when the desired piston position has been attained.

Speed sensors 56 and 58 are provided to send to the electronic control 48 signals indicative of the speed of the engine 8 and the speed of the input shaft 14 respectively. Alternatively, in place of the sensor 58 another sensor may be used to observe the speed of the output shaft 12 and send signals to the electronic control 48. The electronic control 48 can then automatically calculate the speed of the input shaft 14 using the observed speed of the shaft 12 and the ratio of the engaged gear in the gearbox 10, because the system can be arranged so that electronic control always knows which gear ratio is currently engaged and thus which ratio to use in the calculations.

Electronic control 48 is also connected by two signal paths 60 and 62 to the gearbox 10 and the gear lever 16 respectively. The information in the signal on line 60 from gearbox condition sensor 61 indicates when a gear ratio is engaged and when no gear ratio is engaged. As a consequence the electronic control 48 observes, when a new gear ratio is engaged, if the engaged new ratio is higher than the immediately previously engaged ratio (namely that the gear change is an up-shift. In the arrangement shown in FIG. 2 the electronic control 48 does this by "seeing" that the speed of the input shaft 14 has dropped significantly below the speed of the engine 8. Information in the signal on line 62 indicates when the driver desires or does not desire to change gear. Gear lever 16 comprises a shaft 64 arranged to pivot universally at 66. A tube 68 surmounted by hand knob 70 is pivotably mounted at 72 on the shaft 64 so that the tube can wobble or rock slightly relatively to the shaft. Such wobbles caused by the driver grasping the knob 70 causes switch or transducer means 74 to initiate a signal on line 62 indicating the driver's wish to change gear. In response the controls 48 and 46 automatically function causing the clutch 20 automatically to disengage fully. Further manual movement of the knob 70 causes the shaft 64 to move to cause operation of the gear ratio change means to cause disengagement of the hitherto engaged gear ratio and the engagement of another gear ratio. That engagement produces a signal on line 60 causing controls 48 and 46 automatically to function so that the clutch 20 is re-engaged automatically. In the case of an up-shift the manner of the clutch re-engagement will be described in more detail below.

Engine 8 in FIG. 2 is a petrol engine having a fuel supply system comprising a carburettor 76 comprising air-filter 78, induction pipe 80, fuel jet 82 and a pivotting butterfly or flap valve 84. In this example 100% or full throttle is when the valve 84 is pivotted to the position providing least obstruction to air-flow along the pipe 80 permitted by the design of the carburettor, and 0% or zero throttle is when the valve 84 is in the position providing most obstruction permitted by the carburettor design to air-flow along the pipe 80.

The vehicle has a driver operated accelerator or throttle demand pedal 86 which is pivotably movable by the driver to any desired position in a range of permitted movement. One end of the range corresponds to 0% throttle and the other end corresponds to 100% throttle, thus the pedal can be moved in the range to any position corresponding to the percentage throttle the driver desires to demand. So the pedal position at any instant represents a throttle demand signal, and a pedal position sensor 88 provides on signal path 90 signals which are sent to the electronic control 48 and represent the amount of throttle currently being demanded by the driver.

The extent to which the valve 84 is opened can be controlled by motor means 92, for example an electric motor, driving a mechanical connection 94 acting on the valve 84 which has a throttle or valve position sensor 96 sending signals indicative of the valve position on signal path 98 to the electronic control 48. Accordingly, when the electronic control 48 receives a throttle demand signal on path 90 the electronic control automatically sends a signal on path 100 causing the motor means 92 to move the valve 84 to the position providing the desired percentage throttle. The attainment of that position is confirmed to the electronic control 48 by signals from the sensor 96.

The operation of a vehicle provided with the power line described with reference to FIG. 2 will now be described with reference to FIG. 3 over a time period from initiation to completion of an up-shift. In FIG. 3 there are three sets I, II and III of orthogonal axes in which abscissae t represent time, are of the same scale, and commence at the same zero point 0. In set I the ordinate S is speed in revolutions per minute (r.p.m), curve A representing variation in the speed of the engine 8, and curve B representing variation in the speed of the input shaft 14 (and clutch driven plate 32). In set II the ordinate C represents the torque transmitting capacity of the clutch 20, Cl being the pre-determined maximum capacity. Ordinate % T in set III represents percentage throttle.

During the time period from initiation to completion of the up-shift the clutch and throttle are under the control of the electronic control 48 (FIG. 2) operating in accordance with a computer program.

At time t1 the driver wobbles the knob 70 (FIG. 2) signifying an intention to change gear. Accordingly the controls 48 and 46 act to increase the amount of hydraulic fluid in the actuator 44 resulting in the torque transmitting capacity C of the clutch 20 ramping down rapidly at a pre-determined rate (represented by graph section 102) to zero transmitting capacity. It should be noted that at time t1 the driver is demanding Td % throttle, but because electronic control 48 understands that a gear change is taking place control 48 takes full control of the throttle even though the driver may hold pedal 86 steady to continue to demand Td % throttle throughout the gear change. At t1 the control 48 acts on motor means 92 causing the valve 84 to close at a pre-determined rate illustrated by graph section 104. Because the disengaging clutch (section 102) reduces the load on the engine the engine speed increases initially (graph section 106), but only slightly because simultaneously the throttle is closing (graph section 104). Also the rate of increase in the speed of the clutch driven plate 32 decreases (graph section 108) since the freewheeling vehicle now begins to drive the gearbox 10 and input shaft 14. After initially closing the throttle at a pre-determined rate (graph section 104) the electronic control 48 holds the throttle open at Tc%, Tc being a value calculated by control 48 and being a function of the speed of the clutch driven plate, observed by sensor 58.

As the driver continues the gear change by still pushing on the knob 70 to move the shaft 64, synchroniser cones associated with the desired new gear ratio engage at time t2 having the effect of rapidly decelerating the driven plate (graph section 110) down to speed Sn which is the speed at which the momentum of the vehicle is driving the input shaft 14 via the gearbox. Because the control 48 senses the decrease (graph section 110) in clutch driven plate speed, the control again acts on the motor means 92 to close the throttle at a pre-determined rate (graph section 112) from Tc% to 0%. Because the throttle is closed further at time t2 the speed of the engine 8 starts to slow (graph section 114) under the effect of zero throttle. The drop in speed of the clutch driven plate 32 between times t2 and t3 is sufficient for the control 48 to detect that an up-shift is taking place.

Between times t3 and t4 the synchroniser sleeve associated with the new ratio becomes engaged. Thus at time t4 the sensor 61 signals control 48 that a gear ratio has been engaged. Because it is an up-shift the electronic control 48 responds by continuing to maintain the throttle at 0% (graph section 116) and operates the hydraulic clutch control 46 to reduce the amount of fluid in the hydraulic actuator 44 at time t4 so that the torque transmitting capacity C of the clutch 20 starts to increase at a pre-determined relatively fast rate (graph section 118) up to a target torque transmitting capacity Ct. The value Ct in calculated by the electronic control 48 and is a function of substantially the current engine speed and substantially the current amount of throttle demanded by the driver at pedal 86, Ct being calculated to be substantially equal to the engine torque output which would be delivered at that engine speed if the percentage throttle were equal to that being demanded by the driver.

As the clutch 20 is engaged, the pressure plate 28 moves closer to the counter-pressure plate 26 until a kiss point is reached at time t5 where the driven plate 32 is so pressed against the counter-pressure plate that load of the vehicle a now effectively applied to the engine 8 and the engine speed reduces more rapidly (graph section 120). This is because the clutch 20 is acting as an engine brake. Because the vehicle is so heavy its momentum is little influenced and thus the speed of the clutch driven plate remains substantially constant at Sn (graph section 122).

After attainment of the target torque transmitting capacity Ct at time t6, the electronic control 48 continues to cause the hydraulic control 46 to reduce the amount of fluid in the actuator 44 so that the torque transmitting capacity of the clutch 20 continues to increase (graph section 124) but at a pre-determined lower rate until at time t9 the torque transmitting capacity of the clutch is restored to its pre-determined maximum value Cl.

A pre-determined time period tx commences to be counted out in the electronic control 48 when the gear ratio engaged signal appears at time t4. The expiry of the period tx occurs at time t7 whilst the clutch is still being returned to its maximum transmitting capacity Cl. Over the period between t6 and t7 the torque transmitting capacity of the clutch 20 continues to increase and thus the braking effect of the clutch on the engine 8 continues as illustrated at graph portion 126 in which the rate of reduction of engine speed or deceleration is shown increasing. When the time period tx is counted out at t7 the electronic control 48 instructs the motor means 92 to open the valve 84 so that the amount the throttle is open increases at a pre-determined rate (graph section 128) until at time t8 the throttle reaches Td% which is equal to that currently being demanded by the driver at the pedal 86. When the electronic control 48 detects that the throttle has become open to the extent being demanded by the driver the electronic control automatically returns to the operating mode in which further movement of the valve 84 is in response to movement of the pedal 86. Over the time period between times t7 and t8 the effect of increasing the percentage of throttle opposes the engine braking effect exerted by the clutch, and engine deceleration decreases (graph section 130) until the engine speed becomes substantially equal to the immediately hitherto substantially constant speed Sn of the input shaft 14 and clutch driven plate 32. Thereafter the combined effect of the open throttle and the increasing torque transmitting capacity of the clutch 20 causes the synchronised speeds of the engine 8 and input shaft 14 to increase at the same rate to accelerate the vehicle 2 (graph section 132).

It will be seen in FIG. 3 that the throttle becomes open at the time t8 to substantially the amount being demanded by the driver, and time t8 is substantially the same time as when the speeds of the engine 8 and the input shaft 14 become equal.

Instead of using expiry of time period tx as a trigger to open to throttle and return it to driver control, the electronic control 48 may be programmed to calculate engine deceleration from engine speed observations and use that deceleration value in a calculation (taking account of the increasing braking effect of the re-engaging clutch and the opposing effect thereto of the opening throttle) to predict when the speeds of the engine 8 and input shaft 14 will become equal. Since the rate at which the electronic control 48 can open the throttle is known, the electronic control can calculate when to instruct the motor means 92 to start opening the throttle to ensure that the throttle becomes open to the amount Td (currently being demanded by the driver at the pedal 86) at the same time as the input shaft 14 and engine speeds become equal.

The valve 84 may have restoring or spring means acting thereon to assist the motor means 92 in moving the valve 84 towards the zero throttle position.

In a modification the mechanical connection 94 can be extended by mechanical means 95 (FIG. 2) so that when the throttle is under driver control the mechanical connection 94, 95 transmits movement from the pedal 86 to the valve 84, the motor means 92 being used only to operate the throttle as illustrated by the curve in axes set III in FIG. 3 during the course of a gear change. Such a modification using a Bowden cable and an electric motor is disclosed in our pending British Patent Application No. 8723546.

In FIG. 4 the petrol engine 8 has a fuel supply comprising a petrol injection system controlled by electronic control 48 (FIG. 2) and comprising the butterfly or flap valve 84 in an induction pipe 80A and a petrol injection arrangement 140 (known per se) operative in response to electrical signals on path 142 from the electronic control. In known manner the arrangement 140 supplies fuel in amounts automatically correlated to the extent to which the valve 84 is open. Thus when the engine 8 has the fuel injection system, the latter can be throttled substantially as illustrated in FIG. 3. In FIG. 4 references 92, 94, 96, 98 and 100 indicate the same or comparable parts as they do in FIG. 2.

In FIG. 5, diesel engine 8A has a fuel supply comprising a fuel metering valve system 150 known per se controlled in a known manner by a rack 152 moved, to vary the amount of fuel being supplied, by motion transmitted through the mechanical link 94 from the motor means 92 receiving control signals on the path 100. A rack or throttle position sensor 154 sends throttle position signals in the path 98 to the electronic control 48 (FIG. 2).

I claim:

1. A power line, to drive at least one ground running wheel (4) of a motor vehicle (2), said power line comprising an internal combustion engine (8) giving a rotary motion output, fuel supply means (76; 80A, 84, 140; 150, 152) to supply fuel to said engine, said fuel supply means comprising controllable throttle means (80, 84; 80A, 84, 140; 150, 152) openable and closeable to vary the amount that the throttle means is open to increase and decrease supply of fuel to the engine, a change-speed gearbox (10) having a rotary output shaft (12) for supplying rotary motion to said ground running wheel and a rotary input shaft (14) for receiving output torque from the engine and a plurality of gear ratios between said shafts, each gear ratio being engageable and disengageable in response to operation of gear ratio selector means (16) in response to manual action of a driver of the vehicle, a clutch (20) interposed between said engine and said input shaft for transmitting engine output torque to the input shaft, clutch control means (46, 48) operable to vary the torque transmitting capacity of said clutch over a range from a pre-determined maximum capacity (Cl) to substantially zero capacity, the clutch control means being responsive to occurrence of a first signal (62) indicative of a wish by the driver to disengage the currently engaged said gear ratio and being responsive to occurrence of a second signal (60) indicative that another said gear ratio has been engaged, said clutch control means responding to said first signal to cause the clutch automatically to disengage substantially fully and responding to said second signal to cause the clutch automatically to engage substantially fully, and throttle control means (86, 88, 48, 92, 94) to open and close said throttle means in response to driver initiated throttle demand signals, characterised in that the throttle control means (48, 86, 88, 92, 94, 96) is automatically operable on occurrence of said first signal (62) to vary the amount which said throttle means (80, 84; 80A, 84, 140; 150, 152) is open and is automatically operable on the subsequent occurrence of the second signal (60) to restore the throttle means substantially to an open amount (Td) corresponding to that being demanded by the driver's current throttle demand signal (90), upon the occurrence (t1) of said first signal the throttle control means is automatically operated to at least reduce the amount that the throttle means is open to a value (%T ... Tc ... 0) lower than that (Td) currently demanded by the driver, and upon occurrence (t4) of said second signal signifying to said clutch control means (46, 48) engagement of a higher gear ratio than the previously engaged ratio the clutch (20) is automatically engaged such that the torque transmitting capacity (C) of the clutch (20) is increased from substantially clutch fully disengaged up to a target torque transmitting capacity (Ct) which is less than said pre-determined maximum (Cl) and in the course of said increase up to the target torque transmitting capacity (Ct) the torque transmitting capacity (C) of the clutch (20) is increased at a first rate (118) and after attaining said target torque transmitting capacity (Ct) the torque transmitting capacity (C) of the clutch (20) is automatically increased at a lower second rate (124) towards said pre-determined maximum (Cl), and wherein in the course of increasing the torque transmitting capacity at said first rate (118) the engaging clutch (20) causes the engine (8) to so slow that engine deceleration (120) is greater than any (114) immediately before occurrence (t4) of the second signal.

2. A power line as claimed in claim 1, characterised in that upon the occurrence (t4) of said second signal (60) signifying to said clutch control means (46, 48) engagement of a higher gear ratio than the previously engaged ratio the clutch (20) is automatically engaged such that the torque transmitting capacity (C) of the clutch (20) is increased at the first rate (118) from substantially clutch fully disengaged up to the target torque transmitting capacity (Ct) and then automatically at a lower second rate (124) from said target torque transmitting capacity (Ct) towards said pre-determined maximum (Cl).

3. A power line as claimed in claim 1, characterised in that clutch is a friction clutch (20) comprising a clutch driven plate (32) which rotationally is substantially fast with said input shaft (14).

4. A power line as claimed in claim 1, characterised in that the target torque capacity (Ct) of the clutch (20) is substantially equal to the torque output the engine (8) would have been delivering at substantially the time (t6) that the clutch attains said target torque capacity (Ct)and the throttle means (80, 84; 80A, 84, 140; 150, 152) were open to the amount (Td) being demanded by the driver's current throttle demand signal (90).

5. A power line as claimed in claim 1, characterised in that, upon occurrence of said first signal (62) the throttle control means (48, 86, 88, 92, 94, 96) is arranged to operate automatically to close the throttle means (80, 84; 80A, 84, 140; 150, 152) to substantially its closed or minimum position.

6. A power line as claimed in claim 1, characterised in that subsequent to occurrence of said greater deceleration (120) of said engine (8), the throttle control means (48, 86, 88, 92, 94, 96) is arranged to operate automatically to restore the throttle means (80, 84; 80A, 84, 140; 150, 152) substantially to the open amount (Td) corresponding to that being demanded by the driver's current throttle demand signal (90).

7. A power line as claimed in claim 6, characterised in that the attainment of said open amount (Td) by the throttle means (80, 84; 80A, 84, 140; 150, 152) occurs after the expiry of a pre-determined period of time (tx) after the initial occurrence (t4) of said second signal (60).

8. A power line as claimed in claim 6, characterised in that the attainment of said open amount (Td) by the throttle means (80, 84; 80A, 8f4, 140; 150, 152) occurs at substantially the same time (t8) that the speeds (A, B) of the engine (8) and the input shaft (14) become the same.

9. A power line as claimed in claim 6 characterised in that, after the clutch (20) attains said target torque transmitting capacity (Ct), the throttle control means (48, 86, 88, 92, 94, 96) operates automatically to restore the throttle means (80, 84; 80A, 84, 140; 150, 152) to the open amount (Td) corresponding to that demanded by the driver's current throttle demand signal (90).

10. A power line is claimed in claim 6, characterised in that the throttle means (80, 84; 80A, 84, 140; 150, 152) is restored to the open amount (Td) corresponding to that demanded by the driver's current throttle demand signal (90) before the clutch transmitting capacity (C) becomes said pre-determined maximum (Cl).

11. A motor vehicle (2) comprising a power line, to drive at least one ground running wheel (4) of a motor vehicle (2), said power line comprising an internal combustion engine (8) giving a rotary motion output, fuel supply means (76; 80A, 84, 140; 150, 152) to supply fuel to said engine, said fuel supply means comprising controllable throttle means (80, 84; 80A, 84, 140; 150, 152) openable and closeable to vary the amount that the throttle means is open to increase and decrease supply of fuel to the engine, a change-speed gearbox (10) having a rotary output shaft (12) for supplying rotary motion to said ground running wheel and a rotary input shaft (14) for receiving output torque from the engine and a plurality of gear ratios between said shafts, each gear ratio being engageable and disengageable in response to operation of gear ratio selector means (16) in response to manual action of a driver of the vehicle, a clutch (20) interposed between said engine and said input shaft for transmitting engine output torque to the input shaft, clutch control means (46, 48) operable to vary the torque transmitting capacity of said clutch over a range from a pre-determined maximum capacity (Cl) to substantially zero capacity, the clutch control means being responsive to occurrence of a first signal (62) indicative of a wish by the driver to disengage the currently engaged said gear ratio and being responsive to occurrence of a second signal (60) indicative that another said gear ratio has been engaged, said clutch control means responding to said first signal to cause the clutch automatically to disengage substantially fully and responding to said second signal to cause the clutch automatically to engage substantially fully, and throttle control means (86, 88, 48, 92, 94) to open and close said throttle means in response to driver initiated throttle demand signals, characterised in that the throttle control means (48, 86, 88, 92, 94, 96) is automatically operable on occurrence of said first signal (62) to vary the amount which said throttle means (80, 84; 80A, 84, 140; 150, 152) is open and is automatically operable on the subsequent occurrence of the second signal (60) to restore the throttle means substantially to an open amount (Td) corresponding to that being demanded by the driver's current throttle demand signal (90), upon the occurrence (t1) of said first signal the throttle control means is automatically operated to least reduce the amount that the throttle means is open to a value (%T ... Tc ... 0) lower than that (Td) currently demanded by the driver, and upon occurrence (t4) of said second signal signifying to said clutch control means (46, 48) engagement of a higher gear ratio that the previously engaged ratio the clutch (20) is automatically engaged such that the torque transmitting capacity (C) of the clutch (20) is increased from substantially clutch fully disengaged up to a target torque transmitting capacity (Ct) which is less than said pre-determined maximum (Cl) and in the course of said increase up to the target torque transmitting capacity (Ct) the torque transmitting capacity (C) of the clutch (20) is increased at a first rate (118) and after attaining said target torque transmitting capacity (Ct) the torque transmitting capacity (C) of the clutch (20) is automatically increased at a lower second rate (124) towards said pre-determined maximum (C1), and wherein in the course of increasing the torque transmitting capacity at said first rate (118) the engaging clutch (20) causes the engine (8) to so slow that engine deceleration (120) is great than any (114) immediately before occurrence (t4) of the second signal.

* * * * *